United States Patent
Yoshitomo et al.

(10) Patent No.: US 8,071,905 B2
(45) Date of Patent: Dec. 6, 2011

(54) GAS CIRCUIT BREAKER

(75) Inventors: Yuji Yoshitomo, Tokyo (JP); Daisuke Yoshida, Tokyo (JP); Haruhiko Kohyama, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 527 days.

(21) Appl. No.: 11/905,612

(22) Filed: Oct. 2, 2007

(65) Prior Publication Data

US 2008/0257865 A1     Oct. 23, 2008

(30) Foreign Application Priority Data

Mar. 29, 2007   (JP) ................ 2007-089132

(51) Int. Cl.
  *H01H 33/02*   (2006.01)
(52) U.S. Cl. ............ 218/155; 218/152; 218/14
(58) Field of Classification Search ............. 218/2–14, 218/43, 44, 78–80, 84, 152–155
See application file for complete search history.

(56) References Cited

U.S. PATENT DOCUMENTS 5,777,843 A * 7/1998 Younce ............ 361/641

FOREIGN PATENT DOCUMENTS

| JP | 61-135437 U | 8/1986 |
|---|---|---|
| JP | 61-151231 U | 9/1986 |
| JP | 08-256409 A | 10/1996 |
| JP | 2000-067713 A | 3/2000 |
| JP | 2000-166031 A | 6/2000 |
| JP | 2003-009318 A | 1/2003 |

OTHER PUBLICATIONS

Japanese Decision of a Patent Grant dated Aug. 30, 2011 issued in the corresponding Japanese Patent Application No. 2007-089132 and English translation.

* cited by examiner

*Primary Examiner* — Renee S Leubke
*Assistant Examiner* — Marina Fishman
(74) *Attorney, Agent, or Firm* — Buchanan Ingersoll & Rooney PC

(57) ABSTRACT

A gas circuit breaker includes a grounded tank corresponding to each one of the plurality of phases, a bushing, an upper housing, and a lower housing, those mounted on a base that is supported by a frame. The grounded tank and the upper housing are located on a plane. The lower housing is connected to the grounded tank with a connecting unit such that the lower housing can be moved from a first position for operation lower than the plane to a second position for transportation substantially on the plane.

11 Claims, 4 Drawing Sheets

FRONT VIEW

FRONT VIEW

SIDE VIEW

FRONT VIEW

SIDE VIEW

PRIOR ART

GAS CIRCUIT BREAKER

BACKGROUND OF THE INVENTION

1. Field of the Invention

The present invention relates to a gas circuit breaker installed in a substation or a switching station.

2. Description of the Related Art

A technology disclosed in Japanese Patent Application Laid-Open No. 2003-009318 is generally related to a 168-kV gas circuit breaker, that is, a high-voltage gas circuit breaker, for installing in a substation or a switching station, and specifically to transportation of the 168-kV gas circuit breaker. The disclosed 168-kV gas circuit breaker includes a base, three grounded tanks installed with two bushings each, an operation box housing three operating mechanisms, and a controlling box. The grounded tanks, the operation box, and the controlling box are mounted on the base to form a main body. At the time of transportation, the 168-kV gas circuit breaker is dismantled into the main body, a frame on which the main body is mounted, and a cable protection duct.

Because the gas circuit breaker disclosed in the Japanese Patent Application Laid-Open No. 2003-009318 is the high-voltage 168-kV gas circuit breaker, if the controlling box is located as high as the grounded tanks and the operation box, a distance between the controlling box and the bushings is sufficient for insulation, that is, no problems occur even while the gas circuit breaker is in operation.

However, in an extra high-voltage gas circuit breaker (for example, 362-kV gas circuit breaker) from which long bushings extend, the controlling box is required to be located lower than the grounded tanks and the operation box to ensure a sufficient insulation distance between the bushings and the controlling box. The operation box is called an upper housing and the controlling box is called a lower housing. When a conventional extra high-voltage gas circuit breaker is to be transported, it is to be dismantled into different parts such as a main body formed from grounded tanks installed with bushings and the upper housing both placed on the base, a frame, the lower housing, a gas pipe, and an electric conduit so that the conventional extra high-voltage gas circuit breaker is within the height limit appropriate for transportation.

Such type of gas circuit breaker is required to be manufactured and assembled in the factory before transportation to a substation where the gas circuit breaker works. However, in the case of the extra high-voltage gas circuit breaker, the lower housing, the gas pipe, and the cable duct are detached from the main body at transportation. That is, the gas circuit breaker for an extra high-voltage is transported in a state dismantled into the main body configured to have the grounded tanks installed with the bushings and the upper housing both mounted on the base, the frame, the lower housing, the gas pipe, and the cable duct. Therefore, the gas circuit breaker that is once assembled at the factory is dismantled for transportation after electrical inspection and gas leak inspection. Thereafter, the gas circuit breaker is reassembled at the substation.

Because the number of dismantled units is large, it takes long time to assemble the gas circuit breaker that is transported to the substation. Moreover, the electrical inspection and the gas leak inspection are to be conducted again, which causes the installation work to take longer.

SUMMARY OF THE INVENTION

It is an object of the present invention to at least partially solve the problems in the conventional technology.

According to an aspect of the present invention, a gas circuit breaker includes a grounded tank corresponding to each one of a plurality of electric phases, the grounded tank being located on a plane and configured to house a main circuit that includes moving parts of interrupter, and configured to be filled with an insulating gas; a bushing that extends from the grounded tank to electrically connect the main circuit to outside; an upper housing that is located substantially on the plane and is configured to house an operating mechanism for driving the moving parts of interrupter; a lower housing that is located at a position lower than the plane, the lower housing configured to house a controlling device that electrically controls operation of the operating mechanism and a gas refilling port for refilling the insulating gas into the grounded tank; a base that supports the grounded tank from which the bushing extends, the upper housing, and the lower housing; a frame that supports the base; and a connecting unit that connects the lower housing to the grounded tank such that the lower housing can be moved from a first position lower than the plane to a second position substantially on the plane.

According to another aspect of the present invention, a gas circuit breaker includes a grounded tank corresponding to each one of a plurality of electric phases, the grounded tank being located on a plane, configured to house circuitry, and configured to be filled with insulating gas; a bushing that extends from the grounded tank away from the plane; an upper housing that is located substantially on the plane and is configured to house a first controller that controls operation of the circuitry; a lower housing that is configured to house a second controller that controls operation of the first controller and a gas refilling port for refilling the grounded tank with insulating gas; and a coupling unit that couples the lower housing to the grounded tank such that the lower housing can be moved to any position between a first position lower than the plane to a second position substantially above the plane.

The above and other objects, features, advantages and technical and industrial significance of this invention will be better understood by reading the following detailed description of presently preferred embodiments of the invention, when considered in connection with the accompanying drawings

DETAILED DESCRIPTION OF THE PREFERRED EMBODIMENTS

Exemplary embodiments of the present invention are explained in detail below with reference to the accompanying drawings.

Figure 1:
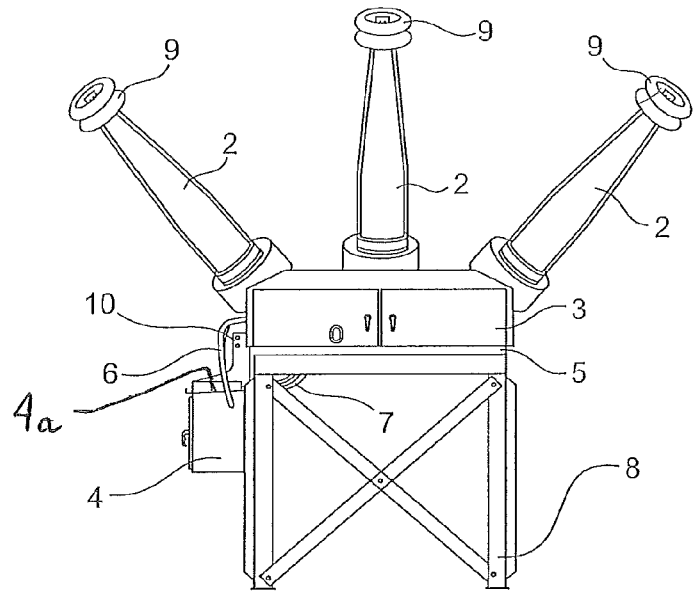
FIG. 1 is a front view of a 362-kV three-phase gang operation type gas circuit breaker according to an embodiment of the present invention.
Figure 2:
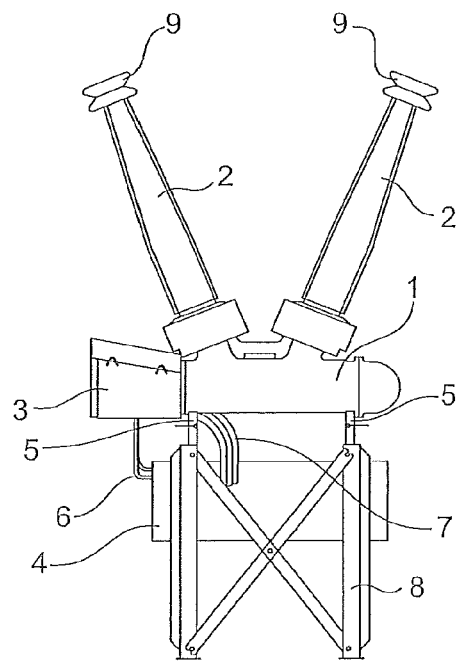
FIG. 2 is a side view of the 362-kV three-phase gang operation type gas circuit breaker shown in FIG. 1.

FIG. 1 is a front view of a 362-kV three-phase gang operation type gas circuit breaker (hereinafter, "362-kV three-phase gas circuit breaker") according to an embodiment of the present invention. FIG. 2 is a side view of the 362-kV three-phase gas circuit breaker.

The 362-kV three-phase gas circuit breaker includes a base 5, grounded tanks 1 each corresponding to one of three phases, a substantially rectangular-shaped upper housing 3, and a substantially rectangular-shaped lower housing 4. The upper housing 3 houses an operating mechanism that drives all moving parts of interrupter of a main circuit inside the grounded tanks 1. Each of the grounded tanks 1 includes two long bushings 2 for air insulation. The three grounded tanks 1 installed with the bushings 2, the upper housing 3, and the lower housing 4 are mounted on the base 5 to form a main body of the gas circuit breaker. The base 5 is mounted on a frame 8.

Each of the three grounded tanks 1 houses a main circuit that includes separable moving parts of interrupter, and is filled with insulation gas. Each of the bushings 2 houses a conductor component that is electrically connected to the main circuit inside the grounded tank 1. The bushing 2 is connected to the outside through a shield 9 provided at an upper portion of the bushing 2 as an external terminal. The bushings 2 are also filled with insulation gas similarly to the grounded tanks 1. The grounded tanks 1, which are arranged in parallel to each other, are connected with a flexible gas pipe 6. The flexible gas pipe 6 passes through the upper housing 3, and is connected to a gas refilling port to refill insulating gas in the lower housing 4.

In addition to the operating mechanism that drives the moving parts of interrupter of the main circuit in the grounded tanks 1, the upper housing 3 houses an additional switching device that performs switching operation according to driving of the operating mechanism. The operating mechanism and the additional switching device are collectively referred to as a switching-operation mechanism. The lower housing 4 houses a controlling device that electrically controls operation of the operating mechanism in the upper housing 3 and the gas refilling port for refilling insulating gas from the lower housing 4 into the grounded tanks 1.

Because voltage is extremely high in the 362-kV three-phase gas circuit breaker, it is necessary to ensure an insulation distance between the bushings 2 located on a centrally positioned grounded tank 1 and the bushings 2 located on the grounded tanks 1 on the left and right sides. Therefore, the bushings 2 located on the grounded tanks 1 on the left and right sides are arranged in a laterally extending manner with respect to the bushings 2 located on the centrally positioned grounded tank 1.

To ensure an insulation distance with respect to the bushings 2 located on the grounded tank 1 on the left or right side (in FIG. 1, to ensure a necessary insulation distance with respect to the bushing 2 located on the grounded tank 1 on the left side), the lower housing 4, which is arranged in parallel to the grounded tank 1, is located lower than the grounded tank 1 and the upper housing 3.

The upper housing 3 is positioned on one side of the grounded tank 1 in a longitudinal direction. Thus, it is possible to reduce the distance between the three grounded tanks 1. It is difficult to integrate the lower housing 4 and the upper housing 3 from the point of view of space. Therefore, the lower housing 4 is arranged, as a separate box, and is arranged in parallel to and lower than one of the grounded tanks 1 positioned on the left or right side.

Figure 3:
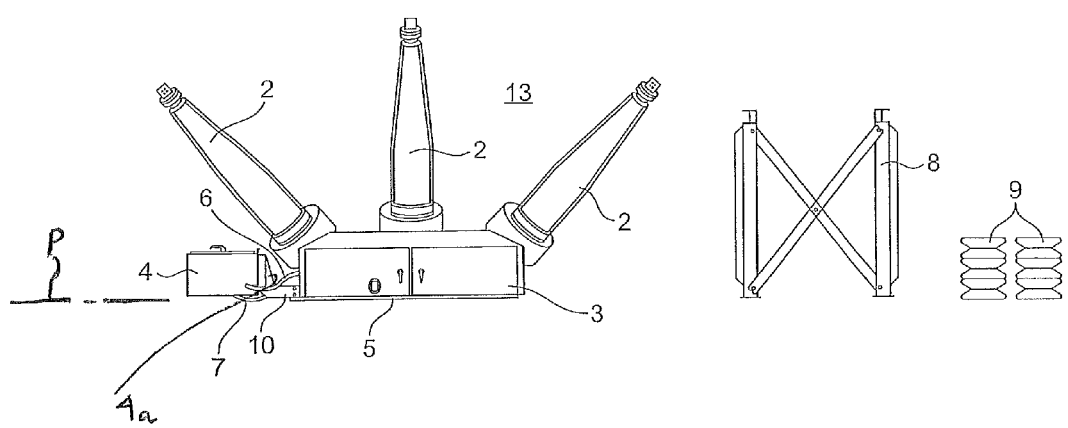
FIG. 3 is a schematic diagram of the 362-kV three-phase gang operation type gas circuit breaker shown in FIG. 1 that is dismantled for transportation.

The base 5 supports the lower housing 4 with a hinge 10 that functions as a position switching mechanism. The lower housing 4 is rotatable 90-degrees so that it can be transported with the main body of the circuit breaker. That is, the lower housing 4 can be in two different positions: an operating position and a transportable position, depending on whether the gas circuit breaker is being operated or is being transported. When in the operating position, the lower housing 4 is positioned lower than the grounded tank 1 as shown in FIG. 1. When in the transportable position, the lower housing 4 is positioned at a level substantially identical with the height of the grounded tank 1 and the upper housing 3 as shown in FIG. 3. Any other mechanism can be used if it fulfills the function identical to the position switching mechanism.

To install the lower housing 4, which is rotatable 90-degrees, the flexible gas pipe 6 is connected from a gas supplying port inside the lower housing 4 to the grounded tanks 1 passing through the upper housing 3. The lower housing 4 and the upper housing 3 are connected with a flexible cable duct 7 that houses an electrical cable that electrically connects the controlling device in the lower housing 4 and the additional switching device in the upper housing 3.

FIG. 3 is a schematic diagram of the 362-kV three-phase gas circuit breaker dismantled for transportation. A circuit-breaker main body unit 13 is an integrated structure configured of the grounded tanks 1, the upper housing 3, the lower housing 4, those mounted on the base 5 as shown in FIGS. 1 and 2. When the circuit-beaker main body unit 13 is to be dismantled from the operating position shown in FIGS. 1 and 2 to the transportable position shown in FIG. 3, the circuit-breaker main body unit 13 is detached from the frame 8. When deforming to the transportable position, the lower housing 4 is rotated 90-degrees around the hinge 10 in to be arranged in a horizontal position, so that the height of the circuit-breaker main body unit 13 is within the limit of transportable height. The dismantled 362-kV three-phase gas circuit breaker is transported to a substation in about two packages. At the substation, the circuit-breaker main body unit 13 is mounted on the frame 8, and the lower housing 4 is rotated back 90-degrees to the operating position. A process of installation of the circuit-breaker main body unit 13 is completed by attaching the shield 9 on top of six bushings 2.

Although the embodiment is applied to the 362-kV three-phase gas circuit breaker, it can be applied to a 362-kV single-phase simple gas circuit breaker. In the case of the 362-kV single-phase simple gas circuit breaker, three switching mechanisms for each of the phases (i.e., the operating mechanism and the additional switching device) is required to be installed in the upper housing 3. It is also possible to apply the embodiment to a gas circuit breaker that has a voltage higher than 362-kV.

Figure 4:
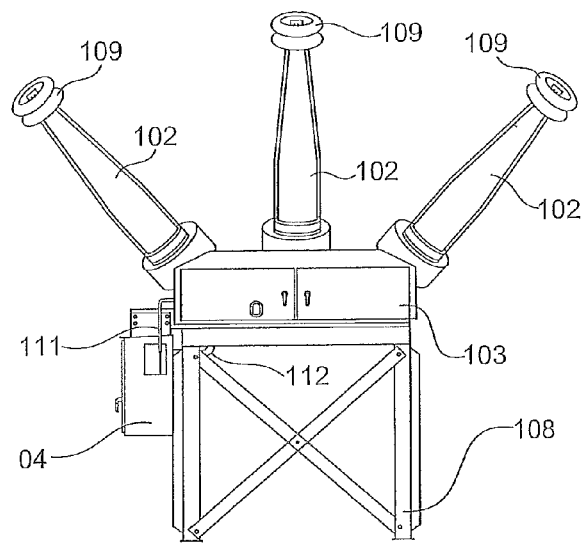
FIG. 4 is a front view of a conventional 362-kV three-phase gang operation type gas circuit breaker.
Figure 5:
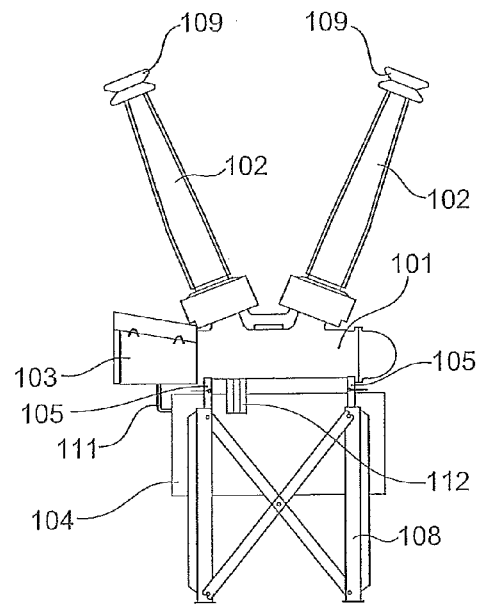
FIG. 5 is a side view of the conventional 362-kV three-phase gang operation type gas circuit breaker shown in FIG. 4.
Figure 6:
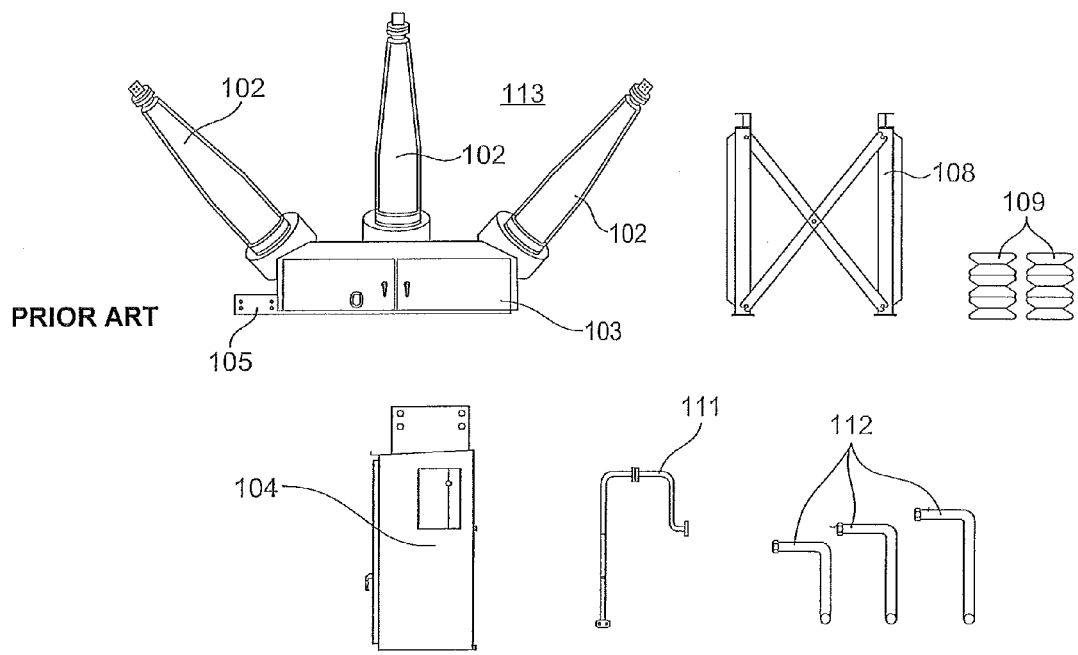
FIG. 6 is a schematic diagram of the conventional 362-kV three-phase gang operation type gas circuit breaker shown in FIG. 4 that is dismantled for transportation.

FIG. 4 is a front view of a conventional 362-kV three-phase gas circuit breaker. FIG. 5 is a side view of the conventional 362-kV three-phase gas circuit breaker. FIG. 6 is a schematic diagram of the conventional 362-kV three-phase gas circuit breaker dismantled for transportation.

The conventional 362-kV three-phase gas circuit breaker includes a grounded tank 101, a bushing 102, a shield 109 provided at an upper portion of the bushing 102, an upper housing 103 that houses an operating mechanism, a lower housing 104, a base 105, a gas pipe 111, a cable duct 112, and a frame 108. The grounded tank 101 that is filled with insulation gas houses a main circuit with separable moving parts of interrupter. The lower housing 104 houses a controlling unit that electrically controls operation of the operating mechanism in each of the phases and a refilling port to refill insulation gas into the grounded tank 101.

To ensure insulation distance with respect to the bushings 102 located on the grounded tanks 101 positioned on the left or right side, the lower housing 104 is located lower than the grounded tank 101 and the upper housing 103. The lower housing 104 is, contrary to the lowering housing 4, fixed to the base 105 with nuts. Therefore, as shown in FIG. 6, it is necessary to detach the lower housing 104 from the base 105 at the time of transportation to comply with the limit of transportable height. That is, the conventional 362-kV three-phase gas circuit breaker is transported in a state dismantled into a circuit-breaker main body unit 113, which is an integrated structure configured of the grounded tanks 101 and the upper housing 103 both mounted on the base 105, the frame 108, the lower housing 104, the shield 109, the gas pipe 111, and the cable duct 112.

When the conventional 362-kV three-phase gas circuit breaker is transported in the manner mentioned above, the conventional 362-kV three-phase gas circuit breaker that is once assembled at a factory is dismantled for transportation after electrical inspection and gas leak inspection. Thereafter, the conventional 362-kV three-phase gas circuit breaker is reassembled at a substation where the gas circuit breaker works. More particularly, the assembly operation at the substation includes mounting on the frame 108 the grounded tanks 101, which are installed with the bushings 102 and houses the main circuit, and the circuit-breaker main body unit 113, which is formed from the upper housing 103 mounted on the base 105, attaching the lower housing 104 to the circuit-breaker main body unit 113, establishing wire connections between the lower housing 104 and the upper housing 103, assembling gas pipes, vacuuming, filling gas, and conducting various checks such as gas leakage inspection and wire control check. Thus, before the conventional 362-kV three-phase gas circuit breaker works at the substation, assembling, dismantling, and reassembling operations are required in addition to various inspections that are conducted twice, that is, after the assembling and the reassembling. In other words, the similar operations that are performed twice and the complicated installation at the substation cause a series of operations to be complicated.

On the other hand, In the 362-kV three-phase gas circuit breaker according to the embodiment, the lower housing 4 can be switched to either the operating position or the transportable by the position switching mechanism such as a hinge depending on whether the gas circuit breaker is being operated or is being transported. When in the operating position, the lower housing 4 is positioned lower than the grounded tank 1 as shown in FIGS. 1 and 2. When in the transportable position, the lower housing 4 is positioned at a level substantially identical with the height of the grounded tank 1 and the upper housing 3 as shown in FIG. 3. That is, because the lower housing 4 is connected to the circuit-breaker main body unit 13 even in the transportable position, the lower housing and the circuit-breaker main body are integrally transported. This makes it possible to reduce the number of dismantled units, thereby minimizing assembly and inspection operations at the factory and at the substation, reducing cost, and achieving high reliability in assembly of the circuit breaker.

According to an embodiment of the present invention, the number of the dismantled units can be reduced. This makes it possible to save establishing of electrical connections between the upper housing and the lower housing and assembly of gas pipes at the substation, thus reducing costs for operation at the substation and achieving high reliability in assembly of the gas circuit breaker.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A gas circuit breaker comprising:
   a grounded tank corresponding to each one of a plurality of electric phases, the grounded tank having a lower portion located on a plane and configured to house a main circuit that includes movable parts of an interrupter, and configured to be filled with an insulating gas;
   a bushing that extends from the grounded tank to electrically connect the main circuit to outside;
   an upper housing having a lower portion located substantially on the plane and configured to house an operating mechanism for driving the movable parts of the interrupter;
   a lower housing configured to house a controlling device that electrically controls operation of the operating mechanism and a gas refilling port for refilling the insulating gas into the grounded tank;
   a base that supports the grounded tank from which the bushing extends, the upper housing, and the lower housing;
   a frame that supports the base; and
   a coupling unit that couples the lower housing relative to the grounded tank such that the lower housing can be moved from a first position lower than the plane to a second position wherein a lower portion of the lower housing is located substantially on the plane.

2. The gas circuit breaker according to claim 1, wherein the coupling unit is a hinge.

3. The gas circuit breaker according to claim 1, further comprising:
   a flexible gas pipe that extends from the gas refilling port of the lower housing to the grounded tank passing through the upper housing; and
   a flexible cable duct that is configured to house a cable that electrically connects the controlling device to the operating mechanism.

4. The gas circuit breaker according to claim 1, wherein
   the upper housing is adjacent to one side-face having a long side of the grounded tank, and
   the lower housing is located substantially parallel to the grounded tank.

5. The gas circuit breaker according to claim 1, wherein the upper housing is box shaped.

6. The gas circuit breaker according to claim 1, wherein
   the gas circuit breaker is a three-phase gang operation type gas circuit breaker, and is configured to include three grounded tanks each having the main circuit that includes at least one of the movable parts of the interrupter, and
   the operating mechanism collectively drives the movable parts of the interrupter.

7. The gas circuit breaker according to claim 6, wherein the upper housing further houses an additional operating mechanism that performs switching operation along with driving of the operating mechanism.

8. The gas circuit breaker according to claim 1, wherein a side of the lower housing faces upwardly when the lower housing is in the first position, and faces toward the grounded tank when the lower housing is in the second position.

9. The gas circuit breaker according to claim 8, wherein said side is horizontally offset from the grounded tank when the lower housing is in the first position.

10. The gas circuit breaker according to claim 1, wherein the frame is removable from the base.

11. A gas circuit breaker comprising:
a grounded tank corresponding to each one of a plurality of electric phases, the grounded tank having a lower portion located on a plane, configured to house circuitry, and configured to be filled with insulating gas;
a bushing that extends from the grounded tank away from the plane;
an upper housing having a lower portion located substantially on the plane and configured to house a first controller that controls operation of the circuitry;
a lower housing that is configured to house a second controller that controls operation of the first controller and a gas refilling port for refilling the grounded tank with insulating gas; and
a coupling unit that couples the lower housing to the grounded tank such that the lower housing is movable from a first position lower than the plane to any second position projecting higher than the plane.

* * * * *